United States Patent
Achten et al.

(10) Patent No.: US 10,752,724 B2
(45) Date of Patent: Aug. 25, 2020

(54) PROCESS FOR PRODUCING POLYISOCYANURATE PLASTICS HAVING FUNCTIONALIZED SURFACES

(71) Applicant: Covestro Deutschland AG, Leverkusen (DE)

(72) Inventors: Dirk Achten, Leverkusen (DE); Hans-Josef Laas, Odenthal (DE); Dieter Mager, Leverkusen (DE); Mathias Matner, Neuss (DE); Heiko Hocke, Shanghai (CN); Jörg Tillack, Solingen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/568,121

(22) PCT Filed: Apr. 21, 2016

(86) PCT No.: PCT/EP2016/058905
§ 371 (c)(1),
(2) Date: Oct. 20, 2017

(87) PCT Pub. No.: WO2016/170060
PCT Pub. Date: Oct. 27, 2016

(65) Prior Publication Data
US 2018/0162981 A1 Jun. 14, 2018

(30) Foreign Application Priority Data
Apr. 21, 2015 (EP) .................................... 15164521

(51) Int. Cl.
*C08G 18/79* (2006.01)
*C08G 18/02* (2006.01)
*C08G 18/73* (2006.01)
*C08G 18/09* (2006.01)
*C08G 18/22* (2006.01)
*C08G 18/28* (2006.01)
*C08G 18/32* (2006.01)
*C08G 18/38* (2006.01)

(52) U.S. Cl.
CPC ......... *C08G 18/022* (2013.01); *C08G 18/092* (2013.01); *C08G 18/225* (2013.01); *C08G 18/2805* (2013.01); *C08G 18/3206* (2013.01); *C08G 18/3228* (2013.01); *C08G 18/3821* (2013.01); *C08G 18/73* (2013.01); *C08G 18/792* (2013.01)

(58) Field of Classification Search
CPC .. C08G 18/022; C08G 18/092; C08G 18/225; C08G 18/2805; C08G 18/3206; C08G 18/3228; C08G 18/3821; C08G 18/73; C08G 18/792
See application file for complete search history.

(56) References Cited

U.S. PATENT DOCUMENTS

| | | |
|---|---|---|
| 3,211,703 A | 10/1965 | Gilman et al. |
| 3,330,828 A | 7/1967 | Grogler et al. |
| 3,487,080 A | 12/1969 | Matsui et al. |
| 3,640,937 A | 2/1972 | Thoma et al. |
| 3,640,967 A | 2/1972 | König et al. |
| 3,658,746 A | 4/1972 | Rosendahl et al. |
| 3,996,223 A | 12/1976 | Gupta et al. |
| 4,040,992 A | 8/1977 | Bechara et al. |
| 4,255,569 A | 3/1981 | Müller et al. |
| 4,288,586 A | 9/1981 | Bock et al. |
| 4,324,879 A | 4/1982 | Bock et al. |
| 4,379,905 A | 4/1983 | Stemmler et al. |
| 4,419,513 A | 12/1983 | Breidenbach et al. |
| 4,487,928 A | 12/1984 | Richter et al. |
| 4,499,253 A | 2/1985 | Kerimis et al. |
| 4,604,418 A | 8/1986 | Shindo et al. |
| 4,613,686 A | 9/1986 | König et al. |
| 4,789,705 A | 12/1988 | Kase et al. |
| 4,808,691 A | 2/1989 | König et al. |
| 4,837,359 A | 6/1989 | Woynar et al. |
| 4,960,848 A | 10/1990 | Scholl et al. |

(Continued)

FOREIGN PATENT DOCUMENTS

| | | |
|---|---|---|
| CA | 2034622 A1 | 8/1991 |
| CA | 2139535 A1 | 8/1995 |

(Continued)

OTHER PUBLICATIONS

International Preliminary Report on Patentability for PCT/EP2016/058901 dated Oct. 24, 2017.
International Preliminary Report on Patentability for PCT/EP2016/058902 dated Oct. 24, 2017.
International Preliminary Report on Patentability for PCT/EP2016/058904 dated Oct. 24, 2017.
International Preliminary Report on Patentability for PCT/EP2016/058905 dated Oct. 24, 2017.
International Preliminary Report on Patentability for PCT/EP2016/058906 dated Oct. 24, 2017.
International Search Report for PCT/EP2016/058901 dated Jun. 30, 2016.
International Search Report for PCT/EP2016/058902 dated Jul. 14, 2016.
International Search Report for PCT/EP2016/058904 dated Jul. 13, 2016.

(Continued)

*Primary Examiner* — Michael L Leonard
(74) *Attorney, Agent, or Firm* — Faegre Drinker Biddle & Reath LLP

(57) ABSTRACT

The invention relates to a process for producing polyisocyanurate plastics having a functionalized surface, comprising the following steps: a) providing a polyisocyanate composition A) containing monomeric and/or oligomeric polyisocyanates; b) catalytically trimerizing the polyisocyanate composition A) so as to obtain a bulk polyisocyanurate material as intermediate; c) surface functionalizing the intermediate by contacting at least one surface of the intermediate with at least one functionalizing reagent D); d) continuing the catalytic trimerization. The invention further relates to a polyisocyanurate plastic having a functionalized surface obtainable from the process of the invention.

17 Claims, No Drawings

(56) References Cited

U.S. PATENT DOCUMENTS

| | | | |
|---|---|---|---|
| 4,994,541 A | 2/1991 | Dell et al. | |
| 5,013,838 A | 5/1991 | Scholl | |
| 5,064,960 A | 11/1991 | Pedain et al. | |
| 5,076,958 A | 12/1991 | Pedain et al. | |
| 5,489,663 A | 2/1996 | Brandt et al. | |
| 5,914,383 A | 6/1999 | Richter et al. | |
| 6,090,939 A | 7/2000 | Richter et al. | |
| 6,133,397 A | 10/2000 | O'Connor et al. | |
| 6,251,985 B1 | 6/2001 | Wamprecht et al. | |
| 6,613,863 B2 | 9/2003 | Kohlstruk et al. | |
| 6,635,761 B1 | 10/2003 | Revelant et al. | |
| 6,765,111 B1 | 7/2004 | Pedain et al. | |
| 8,119,799 B2 | 2/2012 | Binder et al. | |
| 9,169,405 B2 * | 10/2015 | Poppe | B05D 7/577 |
| 2008/0095971 A1 * | 4/2008 | McGee | B32B 5/18 |
| | | | 428/71 |
| 2010/0056702 A1 | 3/2010 | Grahl et al. | |
| 2013/0303758 A1 | 11/2013 | Lucas et al. | |
| 2015/0158966 A1 | 6/2015 | Laas et al. | |
| 2017/0044296 A1 | 2/2017 | Harada | |

FOREIGN PATENT DOCUMENTS

| | | |
|---|---|---|
| CA | 2244486 A1 | 2/1999 |
| CA | 2253119 A1 | 5/1999 |
| DE | 1570540 A1 | 3/1970 |
| DE | 1954093 A1 | 6/1970 |
| DE | 1902931 A1 | 8/1970 |
| DE | 1918204 A1 | 9/1970 |
| DE | 1670666 A1 | 7/1971 |
| DE | 1770245 A1 | 10/1971 |
| DE | 1770591 A1 | 11/1971 |
| DE | 1667309 A1 | 9/1972 |
| DE | 2414413 A1 | 10/1975 |
| DE | 2446440 A1 | 4/1976 |
| DE | 2452532 A1 | 5/1976 |
| DE | 2631733 A1 | 2/1977 |
| DE | 2641380 A1 | 3/1978 |
| DE | 3100263 A1 | 8/1982 |
| DE | 3219608 A1 | 9/1983 |
| DE | 3240613 A1 | 5/1984 |
| DE | 8711301 U1 | 10/1987 |
| DE | 3700209 A1 | 7/1988 |
| DE | 3717060 A1 | 12/1988 |
| DE | 3900053 A1 | 7/1990 |
| DE | 3928503 A1 | 3/1991 |
| DE | 10142816 A1 | 7/2002 |
| EP | 0003765 A1 | 9/1979 |
| EP | 0010589 A1 | 5/1980 |
| EP | 0013880 A1 | 8/1980 |
| EP | 0033581 A1 | 8/1981 |
| EP | 0047452 A1 | 3/1982 |
| EP | 0056158 A1 | 7/1982 |
| EP | 0056159 A1 | 7/1982 |
| EP | 0100129 A1 | 2/1984 |
| EP | 0102482 A2 | 3/1984 |
| EP | 0150769 A2 | 8/1985 |
| EP | 0330966 A2 | 9/1989 |
| EP | 0336205 A2 | 10/1989 |
| EP | 0339396 A1 | 11/1989 |
| EP | 0377177 A1 | 7/1990 |
| EP | 0379914 A2 | 8/1990 |
| EP | 0443167 A1 | 8/1991 |
| EP | 0496208 A2 | 7/1992 |
| EP | 0668271 A1 | 8/1995 |
| EP | 0671426 A1 | 9/1995 |
| EP | 0798299 A1 | 10/1997 |
| EP | 0896009 A1 | 2/1999 |
| EP | 0899282 A2 | 3/1999 |
| EP | 0916647 A2 | 5/1999 |
| EP | 0962455 A1 | 12/1999 |
| EP | 1229016 A2 | 8/2002 |
| EP | 1599526 A1 | 11/2005 |
| EP | 2159238 A1 | 3/2010 |
| EP | 2883895 A1 | 6/2015 |
| GB | 809809 A | 3/1959 |
| GB | 952931 A | 3/1964 |
| GB | 966338 A | 8/1964 |
| GB | 1145952 A | 3/1969 |
| GB | 1244416 A | 9/1971 |
| GB | 1335958 A | 10/1973 |
| GB | 1386399 A | 3/1975 |
| GB | 1391066 A | 4/1975 |
| GB | 1462597 A | 1/1977 |
| GB | 2221465 A | 2/1990 |
| GB | 2222161 A | 2/1990 |
| JP | 2001098042 A | 4/2001 |
| WO | WO-1999023128 A1 | 5/1999 |
| WO | WO-2004078820 A1 | 9/2004 |
| WO | WO-2005087828 A1 | 9/2005 |
| WO | WO-2008110230 A1 | 9/2008 |
| WO | WO-2013167404 A1 | 11/2013 |
| WO | WO-2015166983 A1 | 11/2015 |

OTHER PUBLICATIONS

International Search Report for PCT/EP2016/058905 dated Jul. 8, 2016.
International Search Report for PCT/EP2016/058906 dated Jul. 13, 2016.
Written Opinion of the International Searching Authority for PCT/EP2016/058901 dated Jun. 30, 2016.
Written Opinion of the International Searching Authority for PCT/EP2016/058902 dated Jul. 14, 2016.
Written Opinion of the International Searching Authority for PCT/EP2016/058904 dated Jul. 13, 2016.
Written Opinion of the International Searching Authority for PCT/EP2016/058905 dated Jul. 8, 2016.
Written Opinion of the International Searching Authority for PCT/EP2016/058906 dated Jul. 13, 2016.
Cinnamon, S., et al., "Adhesion Properties of Poly(Hexamethylene Diisocyanate) Obtained by Organotin Catalysis", European Polymer Journal, 1908, vol. 16, pp. 147-148.
Dabi, S., et al., "Foam Polymerization of Hexamethylene Diisocyanate by Cobalt Naphthenate", European Polymer Journal, 1982, vol. 18, pp. 549-553.
Dabi, S., et al., "Oligotrimerization of Hexamethylene Diisocyanate by Organometiallic Catalysts", European Polymer Journal, 1980, vol. 16, pp. 831-833.
Flipsen, T., "Design, Synthesis and Properties of New Materials Based on Densely Crosslinked Polymers for Polymer Optical Fiber and Amplifier Applications", Rijksuniversiteit Groningen, University of Groningen, 2000, pp. 1-231.
Hakman, N., "Properties of Polyisocyanurate Resins Obtained by Polymerization of Hexamethylene Diisocyanate by Organotin Catalysts", European Polymer Journal, 1978, vol. 14, pp. 675-678.
Moritsugu, M., et al., "Cyclotrimerization of Diisocyanates Toward High-Performance Networked Polymers with Rigid Isocyanurate Structure: Combination of Aromatic and Aliphatic Diisocyanates for Tunable Flexibility", Journal of Polymer Science, 2013, vol. 51, pp. 2631-2637.
Schildknecht, C.E., et al., "Polymerization Processes", Wiley, New York, 1977, pp. 665-667.

* cited by examiner

PROCESS FOR PRODUCING POLYISOCYANURATE PLASTICS HAVING FUNCTIONALIZED SURFACES

CROSS-REFERENCE TO RELATED APPLICATIONS

This application is a national stage application (under 35 U.S.C. § 371) of PCT/EP2016/058905, filed Apr. 21, 2016, which claims benefit of European Application No. 15164521.5, filed Apr. 21, 2015, both of which are incorporated herein by reference in their entirety.

BACKGROUND OF THE INVENTION

Highly integrated novel technologies, for example in the field of communications, in transport, in medicine, in microelectronics and in microsystems technology, and for the effective generation, storage and utilization of energy, require materials having novel, precisely defined properties and optimized functionalities. Plastics have a high potential for this purpose, since they can be tailored for a multitude of applications and can also themselves assume functions.

Current methods are attempting to unlock this potential by the development of functional polymers and nanostructured (hybrid) materials. Their aim is the exact adjustment of the architecture, functionality, self-assembly and nanostructure of plastics.

It is generally desirable for integration of function that the materials can be incorporated into highly integrated components and complex material composites with the desired functionality and morphology in a reproducible manner, with long-term stability in terms of their function, and in an environmentally compatible and inexpensive manner.

The methods known from the prior art for functionalizing the plastic in a component or even selectively just the surface thereof in a desirable manner very predominantly follow the following strategies:

Firstly, functionality is achieved by adding functional additives and fillers to the plastic. For example, it is possible to achieve isotropic and anisotropic electrical conductivity, and in some cases even thermal conductivity, by incorporating conductive blacks, carbon nanotubes or graphenes into the plastic. A drawback of this approach is that the properties of the bulk material are altered with increasing additive or filler content in the course of incorporation of the additives or fillers.

An alternative is to proceed from an already functionalized monomer unit, which is homo- or copolymerized in order to obtain a functionalized plastic. A drawback of this approach is that the functionality cannot be restricted selectively to a particular region of the plastic, such that the plastic has a substantially homogeneous profile of properties, meaning that there is no difference in the properties of the bulk material and the surface. A further drawback is that functionalized monomer units typically have to be synthesized in a complex manner, and the use thereof in large amounts is therefore uneconomic.

Secondly, plastics having functionalized surfaces are produced, for example, via coating methods by application of a new material layer to an existing bulk material or by material removal methods, wherein material is removed from the surface. A drawback of the coating methods is that the newly applied material layers frequently adhere to the bulk material to an insufficient degree and the functionalized surface thus obtained does not have sufficient long-term stability. The exclusive aim of functionalization by material removal methods is usually a change in the surface structure, and hence is limited in terms of application.

The methods known from the prior art for producing plastics having a functionalized surface accordingly have inadequate efficiency and/or lead to functionalized surfaces having inadequate long-term stability. Against the background of the prior art, there is a need for efficient processes for producing plastics having a functionalized surface which can be functionalized in a controlled manner without loss of the bulk properties, wherein functionalized surfaces having prolonged stability are obtained. The processes described to date in the prior art for producing plastics having a functionalized surface either proceed from existing plastics which are subsequently modified or coated by a wide variety of different surface methods or the self-assembly capacity of materials to form specific heterogeneous structures is utilized.

WO 2015/166983 discloses the use of isocyanurate polymers for encapsulating LEDs. A two-stage process of firstly trimerizing an oligomeric polyisocyanate to provide a bulk polyisocyanurate material and subsequently contacting the surface of the bulk material with a functionalizing agent is not disclosed.

U.S. Pat. No. 6,133,397 only discloses coatings made by trimerizing oligomeric polyisocyanates. It does not disclose a two-step process as disclosed by the present application.

The problem addressed by the present invention was therefore that of providing a novel process for producing polyisocyanurate plastics having a functionalized surface, wherein the functionalized surface is notable for excellent adhesion and stability.

This problem is solved in accordance with the invention by the process specified in Claim 1 and the polyisocyanurate plastic specified in Claim 16.

Advantageous configurations of the invention are specified in the dependent claims and are elucidated in detail hereinafter, as is the general idea of the invention.

BRIEF SUMMARY OF THE INVENTION

The invention provides a process for producing polyisocyanurate plastics having a functionalized surface, comprising the following steps:
 a) providing a polyisocyanate composition A) containing monomeric and/or oligomeric polyisocyanates;
 b) catalytically trimerizing the polyisocyanate composition A) so as to obtain a bulk polyisocyanurate material as intermediate;
 c) surface functionalizing the intermediate by contacting at least one surface of the intermediate with at least one functionalizing reagent D);
 d) continuing the catalytic trimerization.

DETAILED DESCRIPTION OF THE INVENTION

In addition, the invention also provides the polyisocyanurate plastic having a functionalized surface obtainable from the process.

The invention described in detail hereinafter is based on the surprising observation that, by the process of the invention, the known exceptional properties of polyisocyanurate plastics, namely a high chemical, thermal and mechanical stability and transparency, can be combined with the properties that are the aim of a surface functionalization in a particularly advantageous and efficient manner.

It has been found that, surprisingly, catalytic trimerization of a polyisocyanate composition A) containing monomeric and/or oligomeric polyisocyanates to give a bulk polyisocyanurate material as intermediate and subsequent contacting of at least one surface of the intermediate with a functionalizing reagent D), especially an isocyanate-reactive functionalizing reagent D), with subsequent continuation of the trimerization reaction, affords polyisocyanurate plastics having functionalized surfaces and having a functionalization gradient from the surface into the interior of the bulk polyisocyanurate material. By comparison with functionalized surfaces which are typically obtained in the prior art by coating operations on an existing plastic, functionalized surfaces of the polyisocyanurate plastics of the invention have excellent long-term stability.

A further advantage of the process of the invention is its efficiency, and the option of being able to dispense with complex additional functionalization steps. Thus, in the process of the invention, the functionalizing reagent D) is added at a juncture during the production of the polyisocyanate plastic. There is thus no need first to separately produce a polyisocyanate plastic and then functionalize it in a further process by coating with a functionalized surface or reactive functionalization. More particularly, it is also possible in accordance with the invention to add the functionalizing reagent D) in situ, i.e. without isolating the intermediate, during the production of the polyisocyanurate plastics. The process of the invention is particularly efficient as a result, meaning that it is possible to save time, costs and labour.

By selection of a suitable functionalizing reagent, especially of an isocyanate-reactive functionalizing reagent, a multitude of surface-functionalized polyisocyanurate plastics is thus accessible by virtue of the process of the invention. Examples include polyisocyanurate plastics functionalized in a hydrophobic or hydrophilic manner, an electrically conductive or insulating manner, with a high or low refractive index, in a chemical-resistant or readily swellable manner, and in a bioincompatible or biocompatible manner. The bulk material, i.e. the non-functionalized polyisocyanurate plastic, by contrast, is notable for excellent mechanical, chemical and thermal stability, and also, depending on the surface functionalization chosen, additionally for high transparency and clarity.

There follows a detailed elucidation of process steps a) to d) of the invention and the advantageous configurations thereof.

The process of the invention is fundamentally a process for producing polyisocyanurate plastics by catalytic trimerization of a polyisocyanate composition A) (process steps a, b and d). The process of the invention is especially characterized by the surface functionalization effected in step c), which is undertaken on an intermediate from the catalytic trimerization that proceeds in steps b) and d). According to the invention, the functionalizing reagent D) is thus added to the trimerization reaction mixture at a juncture at which trimerization to give the finished polyisocyanurate plastic is still incomplete. The catalytic trimerization referred to by steps b) and d) can quite possibly also proceed continuously, meaning that the intermediate mentioned in step b) need not be isolated. Instead, the functionalizing reagent D) can simply be added (step c)) at a particular juncture in the ongoing trimerization reaction (step b)), and then the trimerization reaction can be continued directly (step d)). However, it is likewise possible to stop the trimerization reaction after step b), optionally to isolate the bulk polyisocyanurate material obtained as intermediate in step b), and to conduct step c) of the invention as a separate process step in terms of space and/or time. In addition, after the process of the invention, in a subsequent step in terms of time, after a first functionalization of a surface of the intermediate (steps c) and d)), the combination of step c) and step d) can be repeated once or more than once, in order thus to functionalize one or more further surfaces or parts of surfaces of the intermediate.

First of all, the production, which underlies the process of the invention, of the polyisocyanurate plastic from the polyisocyanate composition A) of the invention is to be described, before there is then a detailed discussion of the functionalization in step c).

A "polyisocyanurate plastic" as used here is a plastic containing polyisocyanurate. It may also consist predominantly or entirely of a polyisocyanurate. Blends of polyisocyanurates and other plastics are likewise covered by the term "polyisocyanurate plastic" as used here.

When reference is made here to "plastic", this means a product which is very substantially dimensionally stable at room temperature—in contrast, for example, to gels or liquids. The term "plastic" as used here encompasses all standard plastic classes, i.e. especially including thermosets, thermoplastics and elastomers.

A "polyisocyanurate" as used here is any molecule, preferably a polymer, having a plurality of isocyanurate structural units, for example at least 10 isocyanurate structural units. A molecule having a single isocyanurate structural unit can be referred to as "isocyanurate".

The characteristic cyclic isocyanurate structural unit is shown in the following structural formula:

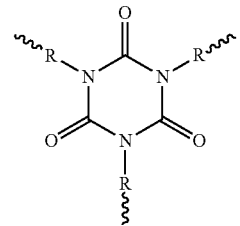

Isocyanurate and polyisocyanurates can be obtained by cyclotrimerization of polyisocyanates. The conventionally operated cyclotrimerization proceeding from monomeric diisocyanates is typically a strongly exothermic reaction.

The term "polyisocyanate" as used here is a collective term for compounds containing two or more isocyanate groups in the molecule (this is understood by the person skilled in the art to mean free isocyanate groups of the general structure —N=C=O). The simplest and most important representatives of these polyisocyanates are the diisocyanates. These have the general structure O=C=N—R—N=C=O where R typically represents aliphatic, alicyclic and/or aromatic radicals.

Because of the polyfunctionality (≥2 isocyanate groups), it is possible to use polyisocyanates to prepare a multitude of polymers (e.g. polyurethanes, polyureas and polyisocyanurates) and low molecular weight compounds (for example those having uretdione, isocyanurate, allophanate, biuret, iminooxadiazinedione and/or oxadiazinetrione structure).

When general reference is made here to "polyisocyanates", this means monomeric and/or oligomeric polyisocyanates alike. For understanding of many aspects of the invention, however, it is important to distinguish between monomeric and oligomeric polyisocyanates. When reference is made here to "oligomeric polyisocyanates", this means polyisocyanates formed from at least two monomeric diisocyanate molecules, i.e. compounds that constitute or contain a reaction product formed from at least two monomeric diisocyanate molecules. Preferably, the monomeric polyisocyanates as used here are monomeric diisocyanates.

The preparation of oligomeric polyisocyanates from monomeric diisocyanates is also referred to here as modification of monomeric diisocyanates. This "modification" as used here means the reaction of monomeric diisocyanates to give oligomeric polyisocyanates having uretdione, isocyanurate, allophanate, biuret, iminooxadiazinedione and/or oxadiazinetrione structure.

For example, hexamethylene diisocyanate (HDI) is a "monomeric diisocyanate" since it contains two isocyanate groups and is not a reaction product of at least two polyisocyanate molecules:

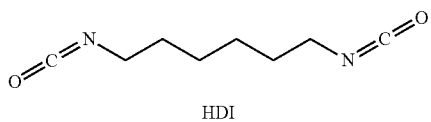

HDI

Reaction products which are formed from at least two HDI molecules and still have at least two isocyanate groups, by contrast, are "oligomeric polyisocyanates" within the context of the invention. Representatives of such "oligomeric polyisocyanates" are, proceeding from monomeric HDI, for example, HDI isocyanurate and HDI biuret, each of which are formed from three monomeric HDI units:

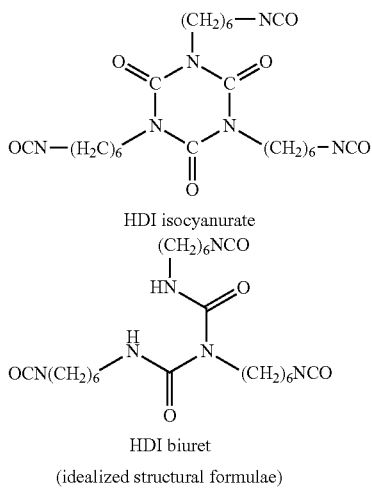

HDI isocyanurate

HDI biuret (idealized structural formulae)

"Polyisocyanate composition A)" in the context of the invention refers to the isocyanate component in the initial reaction mixture. In other words, this is the sum total of all the compounds in the initial reaction mixture that have isocyanate groups. The polyisocyanate composition A) is thus used as reactant in the process of the invention. When reference is made here to "polyisocyanate composition A)", especially to "providing the polyisocyanate composition A)", this means that the polyisocyanate composition A) exists and is used as reactant.

In one embodiment of the invention, the polyisocyanate composition A) contains monomeric and/or oligomeric polyisocyanates. In one embodiment of the invention, the polyisocyanate composition A) consists entirely or to an extent of 25%, 40%, 60%, 80%, 85%, 90%, 95%, 98%, 99% or 99.5% by weight, based in each case on the weight of the polyisocyanate composition A), of monomeric polyisocyanates.

In a preferred embodiment of the invention, the polyisocyanate composition A) used as reactant in the trimerization contains predominantly oligomeric polyisocyanates and is low in monomeric polyisocyanates. In one embodiment of the invention, the polyisocyanate composition A) consists entirely or to an extent of 25%, 40%, 60%, 80%, 85%, 90%, 95%, 98%, 99% or 99.5% by weight, based in each case on the weight of the polyisocyanate composition A), of oligomeric polyisocyanates. This content of oligomeric polyisocyanates is based on the polyisocyanate composition A), meaning that they are not formed, for instance, as intermediate during the process of the invention, but are already present in the polyisocyanate composition A) used as reactant on commencement of the reaction.

"Low in monomers" and "low in monomeric polyisocyanates" are used synonymously here in relation to the polyisocyanate composition A).

Results of particular practical relevance are established when the polyisocyanate composition A) has a proportion of monomeric polyisocyanates in the polyisocyanate composition A) of not more than 20% by weight, especially not more than 15% by weight or not more than 10% by weight, based in each case on the weight of the polyisocyanate composition A). Preferably, the polyisocyanate composition A) has a content of monomeric polyisocyanates of not more than 5% by weight, especially not more than 2.0% by weight, more preferably not more than 1.0% by weight, based in each case on the weight of the polyisocyanate composition A). Particularly good results are established when the polymer composition A) is essentially free of monomeric polyisocyanates. "Essentially free" means that the content of monomeric polyisocyanates is not more than 0.5% by weight, based on the weight of the polyisocyanate composition A).

It is preferable that the polyisocyanate composition A) used is low in monomers. In practice, this can especially be achieved by using, as polyisocyanate composition A), oligomeric polyisocyanates whose preparation involves, after the actual modification reaction, at least one further process step in each case for removal of the unconverted excess monomeric polyisocyanates. In a manner of particular practical relevance, this monomer removal can be effected by processes known per se, preferably by thin-film distillation under high vacuum or by extraction with suitable solvents that are inert toward isocyanate groups, for example aliphatic or cycloaliphatic hydrocarbons such as pentane, hexane, heptane, cyclopentane or cyclohexane.

In a preferred embodiment of the invention, the polyisocyanate composition A) of the invention is obtained by modifying monomeric polyisocyanates with subsequent removal of unconverted monomers.

The processes for producing polyisocyanurate plastics described in the prior art use very substantially monomeric polyisocyanates, i.e. monomeric diisocyanates, as reactants, meaning that pure monomeric polyisocyanates or monomer-rich polyisocyanate compositions are catalytically trimerized. In a particular embodiment of the invention, a low-monomer polyisocyanate composition A) already containing oligomeric polyisocyanates is used. Surprisingly, this leads to much lower volume shrinkage. The relatively low exothermicity of this reaction additionally still allows high-quality polyisocyanurate plastics to be obtained in spite of more rapid and severe reaction conditions.

Preferably, no monomeric polyisocyanate is used in the trimerization reaction of the invention. In a particular embodiment of the invention, however, the polyisocyanate composition A) may contain an extra monomeric diisocyanate. In this context, "extra monomeric diisocyanate" means that it differs from the monomeric polyisocyanates which have been used for preparation of the oligomeric polyisocyanates present in the polyisocyanate composition A). Addition of extra monomeric diisocyanate may be advantageous for achievement of special technical effects, for example an exceptional hardness. Results of particular practical relevance are established when the polyisocyanate composition A) has a proportion of extra monomeric diisocyanate in the polyisocyanate composition A) of not more than 20% by weight, especially not more than 15% by weight or not more than 10% by weight, based in each case on the weight of the polyisocyanate composition A). Preferably, the polyisocyanate composition A) has a content of extra monomeric diisocyanate of not more than 5% by weight, especially not more than 2.0% by weight, more preferably not more than 1.0% by weight, based in each case on the weight of the polyisocyanate composition A).

In a further particular embodiment of the process of the invention, the polyisocyanate composition A) may contain monomeric monoisocyanates or monomeric isocyanates having an isocyanate functionality greater than two, i.e. having more than two isocyanate groups per molecule. The addition of monomeric monoisocyanates or monomeric isocyanates having an isocyanate functionality greater than two has been found to be particularly advantageous in order to influence the network density of the polyisocyanurate plastic. Results of particular practical relevance are established when the polyisocyanate composition A) has a proportion of monomeric monoisocyanates or monomeric isocyanates having an isocyanate functionality greater than two in the polyisocyanate composition A) of not more than 20% by weight, especially not more than 15% by weight or not more than 10% by weight, based in each case on the weight of the polyisocyanate composition A). Preferably, the polyisocyanate composition A) has a content of monomeric monoisocyanates or monomeric isocyanates having an isocyanate functionality greater than two of not more than 5% by weight, especially not more than 2.0% by weight, more preferably not more than 1.0% by weight, based in each case on the weight of the polyisocyanate composition A). Preferably, no monomeric monoisocyanate or monomeric isocyanate having an isocyanate functionality greater than two is used in the trimerization reaction of the invention.

The oligomeric polyisocyanates described here are typically obtained by modifying simple aliphatic, cycloaliphatic, araliphatic and/or aromatic monomeric diisocyanates or mixtures of such monomeric diisocyanates.

The oligomeric polyisocyanates may, in accordance with the invention, especially have uretdione, isocyanurate, allophanate, biuret, iminooxadiazinedione and/or oxadiazinetrione structure. In one embodiment of the invention, the oligomeric polyisocyanates have at least one of the following oligomeric structure types or mixtures thereof:

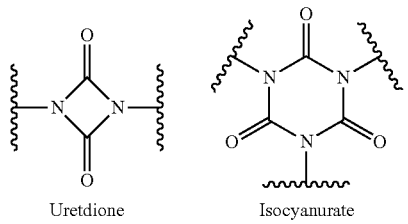

Uretdione    Isocyanurate

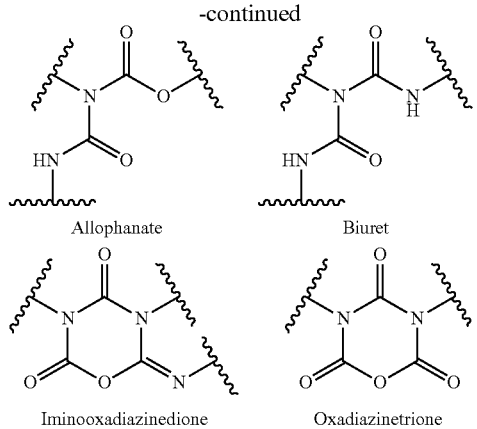

Allophanate    Biuret

Iminooxadiazinedione    Oxadiazinetrione

It has been found that, surprisingly, it can be advantageous to use oligomeric polyisocyanates that are a mixture of at least two oligomeric polyisocyanates, the at least two oligomeric polyisocyanates differing in terms of structure. This structure is preferably selected from the group consisting of uretdione, isocyanurate, allophanate, biuret, iminooxadiazinedione and oxadiazinetrione structure, and mixtures thereof. Starting mixtures of this kind can especially lead, by comparison with trimerization reactions with oligomeric polyisocyanates of just one defined structure, to an effect on the Tg value, which is advantageous for many applications.

Preference is given to using, in the process of the invention, a polyisocyanate composition A) consisting of at least one oligomeric polyisocyanate having biuret, allophanate, isocyanurate and/or iminooxadiazinedione structure and mixtures thereof.

In another embodiment, the polyisocyanate composition A) containing oligomeric polyisocyanates is one containing just a single defined oligomeric structure, for example exclusively or for the most part an isocyanurate structure. In general, as a result of the preparation, however, there are always several different oligomeric structures present alongside one another in the polyisocyanate composition A).

In the context of the present invention, a polyisocyanate composition A) is regarded as a polyisocyanate composition of a single defined oligomeric structure when an oligomeric structure selected from uretdione, isocyanurate, allophanate, biuret, iminooxadiazinedione and/or oxadiazinetrione structure is present to an extent of at least 50 mol %, preferably 60 mol %, more preferably 70 mol %, especially preferably 80 mol % and particularly 90 mol %, based in each case on the sum total of the oligomeric structures from the group consisting of uretdione, isocyanurate, allophanate, biuret, iminooxadiazinedione and oxadiazinetrione structure present in the polyisocyanate composition A).

In the process of the invention, in a further embodiment, a polyisocyanate composition A) of a single defined oligomeric structure is used, the oligomeric structure being selected from uretdione, isocyanurate, allophanate, biuret, iminooxadiazinedione and/or oxadiazinetrione structure and being present to an extent of at least 50 mol %, preferably 60 mol %, more preferably 70 mol %, especially preferably 80 mol % and particularly 90 mol %, based in each case on the sum total of the oligomeric structures present from the group consisting of uretdione, isocyanurate, allophanate, biuret, iminooxadiazinedione and oxadiazinetrione structure in the polyisocyanate composition A).

In a further embodiment, the oligomeric polyisocyanates are those which have mainly isocyanurate structure and which may contain the abovementioned uretdione, allophanate, biuret, iminooxadiazinedione and/or oxadiazinetrione structure only as by-products. Thus, one embodiment of the invention envisages the use of a polymer composition A) of a single defined oligomeric structure, the oligomeric structure being an isocyanurate structure and being present to an extent of at least 50 mol %, preferably 60 mol %, more preferably 70 mol %, especially preferably 80 mol % and particularly 90 mol %, based in each case on the sum total of the oligomeric structures from the group consisting of uretdione, isocyanurate, allophanate, biuret, iminooxadiazinedione and oxadiazinetrione structure present in the polyisocyanate composition A).

It is likewise possible in accordance with the invention to use oligomeric polyisocyanates having very substantially no isocyanurate structure, and containing mainly at least one of the abovementioned uretdione, allophanate, biuret, iminooxadiazinedione and/or oxadiazinetrione structure types. In a particular embodiment of the invention, the polyisocyanate composition A) consists to an extent of 50 mol %, preferably 60 mol %, more preferably 70 mol %, especially preferably 80 mol % and particularly 90 mol %, based in each case on the sum total of the oligomeric structures from the group consisting of uretdione, isocyanurate, allophanate, biuret, iminooxadiazinedione and oxadiazinetrione structure present in the polyisocyanate composition A), of oligomeric polyisocyanates having a structure type selected from the group consisting of uretdione, allophanate, biuret, iminooxadiazinedione and/or oxadiazinetrione structure.

A further embodiment of the invention envisages the use of a low-isocyanurate polyisocyanate composition A) having, based on the sum total of the oligomeric structures from the group consisting of uretdione, isocyanurate, allophanate, biuret, iminooxadiazinedione and oxadiazinetrione structure present in the polyisocyanate composition A), less than 50 mol %, preferably less than 40 mol %, more preferably less than 30 mol % and especially preferably less than 20 mol %, 10 mol % or 5 mol % of isocyanurate structures. A further embodiment of the invention envisages the use of a polymer composition A) of a single defined oligomeric structure type, said oligomeric structure type being selected from the group consisting of uretdione, allophanate, biuret, iminooxadiazinedione and/or oxadiazinetrione structure and this structure type being present to an extent of at least 50 mol %, preferably 60 mol %, more preferably 70 mol %, especially preferably 80 mol % and particularly 90 mol %, based on the sum total of the oligomeric structures from the group consisting of uretdione, isocyanurate, allophanate, biuret, iminooxadiazinedione and oxadiazinetrione structure present in the polyisocyanate composition A).

The proportions of uretdione, isocyanurate, allophanate, biuret, iminooxadiazinedione and/or oxadiazinetrione structure in the polyisocyanate composition A) can be determined, for example, by NMR spectroscopy. It is possible here with preference to use $^{13}$C NMR spectroscopy, preferably in proton-decoupled form, since the oligomeric structures mentioned give characteristic signals.

Irrespective of the underlying oligomeric structure type (uretdione, isocyanurate, allophanate, biuret, iminooxadiazinedione and/or oxadiazinetrione structure), the polyisocyanate composition A) for use in the process of the invention preferably has a (mean) NCO functionality of 2.0 to 5.0, preferably 2.3 to 4.5.

Results of particular practical relevance are established when the polyisocyanate composition A) for use in accordance with the invention has a content of isocyanate groups of 8.0% to 60.0% by weight. It has been found to be of particular practical relevance when the polyisocyanate composition A) of the invention has a content of isocyanate groups of 14.0% to 30.0% by weight, based in each case on the weight of the polyisocyanate composition A).

Preparation processes for oligomeric polyisocyanates having uretdione, isocyanurate, allophanate, biuret, iminooxadiazinedione and/or oxadiazinetrione structure are described, for example, in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

In an additional or alternative embodiment of the invention, the polyisocyanate composition A) is defined in that it contains oligomeric polyisocyanates which have been obtained from monomeric polyisocyanates, irrespective of the nature of the modification reaction used, with observation of an oligomerization level of 5% to 45%, preferably 10% to 40%, more preferably 15% to 30%. "Oligomerization level" is understood here to mean the percentage of isocyanate groups originally present in the starting mixture which is consumed during the preparation process to form uretdione, isocyanurate, allophanate, biuret, iminooxadiazinedione and/or oxadiazinetrione structures.

Suitable monomeric polyisocyanates for the polyisocyanate composition A) or starting compounds for the oligomeric polyisocyanates are any desired monomeric polyisocyanates obtainable in various ways, for example by phosgenation in the liquid or gas phase or by a phosgene-free route, for example by thermal urethane cleavage. Particularly good results are established when the monomeric polyisocyanates are monomeric diisocyanates. Preferred monomeric diisocyanates are those having a molecular weight in the range from 140 to 400 g/mol, having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates. Further diisocyanates that are likewise suitable can additionally be found, for example, in *Justus Liebigs Annalen der Chemie*, volume 562 (1949) p. 75-136.

In addition, it is also possible in the process of the invention to use conventional prepolymers bearing aliphatic or aromatic isocyanate end groups, for example polyether, polyester or polycarbonate prepolymers bearing aliphatic or aromatic isocyanate end groups, as polyisocyanates in the polyisocyanate composition A).

Suitable monomeric monoisocyanates which can optionally be used in the polyisocyanate composition A) are, for example, n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- or 4-methylcyclohexyl isocyanate or any desired mixtures of such monoisocyanates. An example of a monomeric isocyanate having an isocyanate functionality greater than two which can optionally be added to the polyisocyanate composition A) is 4-isocyanatomethyloctane 1,8-diisocyanate (triisocyanatononane; TIN).

In one embodiment of the invention, the polyisocyanate composition A) contains not more than 30% by weight, especially not more than 20% by weight, not more than 15% by weight, not more than 10% by weight, not more than 5% by weight or not more than 1% by weight, based in each case on the weight of the polyisocyanate composition A), of aromatic polyisocyanates. As used here, "aromatic polyisocyanate" means a polyisocyanate having at least one aromatically bonded isocyanate group.

Aromatically bonded isocyanate groups are understood to mean isocyanate groups bonded to an aromatic hydrocarbyl radical.

In a preferred embodiment of the process of the invention, a polyisocyanate composition A) having exclusively aliphatically and/or cycloaliphatically bonded isocyanate groups is used.

Aliphatically and cycloaliphatically bonded isocyanate groups are understood to mean isocyanate groups bonded, respectively, to an aliphatic and cycloaliphatic hydrocarbyl radical.

In another preferred embodiment of the process of the invention, a polyisocyanate composition A) consisting of or comprising one or more oligomeric polyisocyanates is used, where the one or more oligomeric polyisocyanates has/have exclusively aliphatically and/or cycloaliphatically bonded isocyanate groups.

In another preferred embodiment of the process of the invention, a polyisocyanate composition A) consisting of or comprising one or more monomeric polyisocyanates is used, where the one or more monomeric polyisocyanates has/have exclusively aliphatically and/or cycloaliphatically bonded isocyanate groups.

In a further embodiment of the invention, the polyisocyanate composition A) consists to an extent of at least 70%, 80%, 85%, 90%, 95%, 98% or 99% by weight, based in each case on the weight of the polyisocyanate composition A), of monomeric and/or oligomeric polyisocyanates having exclusively aliphatically and/or cycloaliphatically bonded isocyanate groups. Practical experiments have shown that particularly good results can be achieved with polyisocyanate compositions A) in which the oligomeric polyisocyanates present therein have exclusively aliphatically and/or cycloaliphatically bonded isocyanate groups.

In a particularly preferred embodiment of the process of the invention, a polyisocyanate composition A) is used which consists of or comprises one or more oligomeric polyisocyanates, where the one or more oligomeric polyisocyanates is/are based on 1,4-diisocyanatobutane (BDI), 1,5-diisocyanatopentane (PDI), 1,6-diisocyanatohexane (HDI), isophorone diisocyanate (IPDI) or 4,4'-diisocyanatodicyclohexylmethane (H12MDI) or mixtures thereof.

In an alternative embodiment of the process of the invention, a polyisocyanate composition A) comprising one or more monomeric polyisocyanates selected from 1,4-diisocyanatobutane (BDI), 1,5-diisocyanatopentane (PDI), 1,6-diisocyanatohexane (HDI), isophorone diisocyanate (IPDI) and 4,4'-diisocyanatodicyclohexylmethane (H12MDI) or mixtures thereof is used.

The polyisocyanurate plastics of the invention having a functionalized surface are obtainable by catalytic trimerization by the process of the invention. "Catalytic" here means in the presence of a suitable catalyst B) or E).

Suitable catalysts B) for the process of the invention are in principle any compounds which accelerate the trimerization of isocyanate groups to isocyanurate structures. Since isocyanurate formation, depending on the catalyst used, is frequently accompanied by side reactions, for example dimerization to give uretdione structures or trimerization to form iminooxadiazinediones (called asymmetric trimers), and, in the presence of urethane groups in the starting polyisocyanate, by allophanatization reactions, the term "trimerization" in the context of the present invention is also to be used synonymously for these reactions that proceed additionally.

In a particular embodiment, however, trimerization means that predominantly cyclotrimerizations of at least 50%, preferably at least 60%, more preferably at least 70% and especially at least 80% of isocyanate groups present in the polyisocyanate composition A) to give isocyanurate structural units are catalysed. However, side reactions, especially those to give uretdione, allophanate and/or iminooxadiazinedione structures, typically occur and can even be used in a controlled manner in order to advantageously affect, for example, the Tg value of the polyisocyanurate plastic obtained.

Suitable catalysts B) for the process of the invention are, for example, simple tertiary amines, for example triethylamine, tributylamine, N,N-dimethylaniline, N-ethylpiperidine or N,N'-dimethylpiperazine. Suitable catalysts are also the tertiary hydroxyalkylamines described in GB 2 221 465, for example triethanolamine, N-methyldiethanolamine, dimethylethanolamine, N-isopropyldiethanolamine and 1-(2-hydroxyethyl)pyrrolidine, or the catalyst systems that are known from GB 2 222 161 and consist of mixtures of tertiary bicyclic amines, for example DBU, with simple low molecular weight aliphatic alcohols.

Likewise suitable as trimerization catalysts B) for the process of the invention are a multitude of different metal compounds. Suitable examples are the octoates and naphthenates of manganese, iron, cobalt, nickel, copper, zinc, zirconium, cerium or lead that are described as catalysts in DE-A 3 240 613, or mixtures thereof with acetates of lithium, sodium, potassium, calcium or barium, the sodium and potassium salts of linear or branched alkanecarboxylic acids having up to 10 carbon atoms that are known from DE-A 3 219 608, for example of propionic acid, butyric acid, valeric acid, caproic acid, heptanoic acid, caprylic acid, pelargonic acid, capric acid and undecylic acid, the alkali metal or alkaline earth metal salts of aliphatic, cycloaliphatic or aromatic mono- and polycarboxylic acids having 2 to 20 carbon atoms that are known from EP-A 0 100 129, for example sodium or potassium benzoate, the alkali metal phenoxides known from GB-A 1 391 066 and GB-A 1 386 399, for example sodium or potassium phenoxide, the alkali metal and alkaline earth metal oxides, hydroxides, carbonates, alkoxides and phenoxides known from GB 809 809, alkali metal salts of enolizable compounds and metal salts of weak aliphatic or cycloaliphatic carboxylic acids, for example sodium ethoxide, sodium acetate, potassium acetate, sodium acetoacetate, lead 2-ethylhexanoate and lead naphthenate, the basic alkali metal compounds complexed with crown ethers or polyether alcohols that are known from EP-A 0 056 158 and EP-A 0 056 159, for example complexed sodium or potassium carboxylates, the pyrrolidinone-potassium salt known from EP-A 0 033 581, the mono- or polynuclear complex of titanium, zirconium and/or hafnium known from application EP 13196508.9, for example zirconium tetra-n butoxide, zirconium tetra-2-ethylhexanoate and zirconium tetra-2-ethylhexoxide, and tin compounds of the type described in *European Polymer Journal*, vol. 16, 147-148 (1979), for example dibutyltin dichloride, diphenyltin dichloride, triphenylstannanol, tributyltin acetate, tributyltin oxide, tin octoate, dibutyl(dimethoxy)stannane and tributyltin imidazolate.

Further trimerization catalysts B) suitable for the process of the invention are, for example, the quaternary ammonium hydroxides known from DE-A 1 667 309, EP-A 0 013 880 and EP-A 0 047 452, for example tetraethylammonium hydroxide, trimethylbenzylammonium hydroxide, N,N-dimethyl-N-dodecyl-N-(2-hydroxyethyl)ammonium hydroxide, N-(2-hydroxyethyl)-N,N-dimethyl-N-(2,2'-dihydroxymethylbutyl)ammonium hydroxide and 1-(2-hydroxyethyl)-1,4-diazabicyclo[2.2.2]octane hydroxide (monoadduct of ethylene oxide and water with 1,4-diazabicyclo[2.2.2]octane), the quaternary hydroxyalkylammonium hydroxides known from EP-A 37 65 or EP-A 10 589, for example N,N,N-trimethyl-N-(2-hydroxyethyl)ammonium hydroxide, the trialkylhydroxylalkylammonium carboxylates that are known from DE-A 2631733, EP-A 0 671 426, EP-A 1 599 526 and U.S. Pat. No. 4,789,705, for example N,N,N-trimethyl-N-2-hydroxypropylammonium p-tert-butylbenzoate and N,N,N-trimethyl-N-2-hydroxypropylammonium 2-ethylhexanoate, the quaternary benzylammonium carboxylates known from EP-A 1 229 016, such as N-benzyl-N,N-dimethyl-N-ethylammonium pivalate, N-benzyl-N,N-dimethyl-N-ethylammonium 2-ethylhexanoate, N-benzyl-N,N,N-tributylammonium 2-ethylhexanoate, N,N-dimethyl-N-ethyl-N-(4-methoxybenzyl)ammonium 2-ethylhexanoate or N,N,N-tributyl-N-(4-methoxybenzyl) ammonium pivalate, the tetrasubstituted ammonium α-hydroxycarboxylates known from WO 2005/087828, for example tetramethylammonium lactate, the quaternary ammonium or phosphonium fluorides known from EP-A 0 339 396, EP-A 0 379 914 and EP-A 0 443 167, for example N-methyl-N,N,N-trialkylammonium fluorides with $C_8$-$C_{10}$-alkyl radicals, N,N,N,N-tetra-n-butylammonium fluoride, N,N,N-trimethyl-N-benzylammonium fluoride, tetramethylphosphonium fluoride, tetraethylphosphonium fluoride or tetra-n-butylphosphonium fluoride, the quaternary ammonium and phosphonium polyfluorides known from EP-A 0 798 299, EP-A 0 896 009 and EP-A 0 962 455, for example benzyltrimethylammonium hydrogen polyfluoride, the tetraalkylammonium alkylcarbonates which are known from EP-A 0 668 271 and are obtainable by reaction of tertiary amines with dialkyl carbonates, or betaine-structured quaternary ammonioalkyl carbonates, the quaternary ammonium hydrogencarbonates known from WO 1999/023128, such as choline bicarbonate, the quaternary ammonium salts which are known from EP 0 102 482 and are obtainable from tertiary amines and alkylating esters of phosphorus acids, examples of such salts being reaction products of triethylamine, DABCO or N-methylmorpholine with dimethyl methanephosphonate, or the tetrasubstituted ammonium salts of lactams that are known from WO 2013/167404, for example trioctylammonium caprolactamate or dodecyltrimethylammonium caprolactamate.

Further trimerization catalysts suitable for the process of the invention can be found, for example, in J. H. Saunders and K. C. Frisch, Polyurethanes Chemistry and Technology, p. 94 ff. (1962) and the literature cited therein.

The catalysts B) can be used in the process of the invention either individually or in the form of any desired mixtures with one another.

Preferred catalysts B) are metal compounds of the aforementioned type, especially carboxylates and alkoxides of alkali metals, alkaline earth metals or zirconium, and organic tin compounds of the type mentioned.

Particularly preferred trimerization catalysts B) are sodium and potassium salts of aliphatic carboxylic acids having 2 to 20 carbon atoms and aliphatically substituted tin compounds.

Most preferred trimerization catalysts B) for the process of the invention are potassium acetate, tin octoate and/or tributyltin oxide.

In the process of the invention, the trimerization catalyst B) is generally used in a concentration based on the amount of the polyisocyanate composition A) used of 0.0005% to 5.0% by weight, preferably of 0.0010% to 2.0% by weight and more preferably of 0.0015% to 1.0% by weight.

The trimerization catalysts B) that are used in the process of the invention generally have sufficient solubility in the polyisocyanate composition A) in the amounts that are required for initiation of the oligomerization reaction. The catalyst B) is therefore preferably added to the polyisocyanate composition A) in neat form.

Optionally, however, the catalysts B) can also be used dissolved in a suitable organic solvent to improve their incorporability. The dilution level of the catalyst solutions can be freely selected within a very wide range. Catalytically active catalyst solutions are typically those of a concentration over and above about 0.01% by weight.

Suitable catalyst solutions are, for example, solvents that are inert toward isocyanate groups, for example hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxyprop-2-yl acetate, 3-methoxy-n-butyl acetate, propylene glycol diacetate, acetone, methyl ethyl ketone, methyl isobutyl ketone, cyclohexanone, lactones such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulphoxide, triethyl phosphate or any desired mixtures of such solvents.

If catalyst solvents are used in the process of the invention, preference is given to using catalyst solvents which bear groups reactive toward isocyanates and can be incorporated into the polyisocyanurate plastic. Examples of such solvents are mono- and polyhydric simple alcohols, for example methanol, ethanol, n-propanol, isopropanol, n-butanol, n-hexanol, 2-ethyl-1-hexanol, ethylene glycol, propylene glycol, the isomeric butanediols, 2-ethylhexane-1,3-diol or glycerol; ether alcohols, for example 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid higher molecular weight polyethylene glycols, polypropylene glycols, mixed polyethylene/polypropylene glycols and the monoalkyl ethers thereof; ester alcohols, for example ethylene glycol monoacetate, propylene glycol monolaurate, glycerol mono- and diacetate, glycerol monobutyrate or 2,2,4-trimethylpentane-1,3-diol monoisobutyrate; unsaturated alcohols, for example allyl alcohol, 1,1-dimethyl allyl alcohol or oleyl alcohol; araliphatic alcohols, for example benzyl alcohol; N-monosubstituted amides, for example N-methylformamide, N-methylacetamide, cyanoacetamide or 2-pyrrolidone, or any desired mixtures of such solvents.

The polyisocyanurate plastics having a functionalized surface obtainable by the process of the invention, even as such, i.e. without addition of appropriate auxiliaries and additives C), feature very good light stability. Nevertheless, it is optionally possible to use standard auxiliaries and/or additives C) as well in the production thereof, for example standard fillers, UV stabilizers, antioxidants, mould release agents, water scavengers, slip additives, defoamers, levelling agents, rheology additives, flame retardants and/or pigments. These auxiliaries and/or additives C), excluding fillers and flame retardants, are typically present in the polyisocyanurate plastic in an amount of less than 10% by weight, preferably less than 5% by weight, more preferably up to 3% by weight, based on the polyisocyanate composition A). Flame retardants are typically present in the polyisocyanurate plastic in amounts of not more than 70% by weight, preferably not more than 50% by weight and more preferably not more than 30% by weight, calculated as the total amount of flame retardants used, based on the polyisocyanate composition A).

Suitable fillers $C_w$) are, for example $AlOH_3$, $CaCO_3$, metal pigments such as $TiO_2$ and further known standard fillers. These fillers $C_w$) are preferably used in amounts of not more than 70% by weight, preferably not more than 50% by weight and more preferably not more than 30% by weight, calculated as the total amount of fillers used, based on the polyisocyanate composition A).

Suitable UV stabilizers $C_x$) may preferably be selected from the group consisting of piperidine derivatives, for example 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidinyl) sebacate, bis(2,2,6,6-tetramethyl-4-piperidyl) suberate, bis(2,2,6,6-tetramethyl-4-piperidyl) dodecanedioate; benzophenone derivatives, for example 2,4-dihydroxy-, 2-hydroxy-4-methoxy-, 2-hydroxy-4-octoxy-, 2-hydroxy-4-dodecyloxy- or 2,2'-dihydroxy-4-dodecyloxybenzophenone; benzotriazole derivatives, for example 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl) phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides, for example 2-ethyl-2'-ethoxy- or 4-methyl-4'-methoxyoxalanilide; salicylic esters, for example phenyl salicylate, 4-tert-butylphenyl salicylate, 4-tert-octylphenyl salicylate; cinnamic ester derivatives, for example methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4 butoxybenzylidenemalonate. These preferred light stabilizers can be used either individually or in any desired combinations with one another.

Particularly preferred UV stabilizers $C_x$) for the polyisocyanurate plastics producible in accordance with the invention are those which fully absorb radiation of wavelength <400 nm. These include, for example, the benzotriazole derivatives mentioned. Especially preferred UV stabilizers are 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol and/or 2-(5-chloro-2H-benzotriazol-2-yl)-4,6-bis(1,1-dimethylethyl)phenol.

It is optionally possible to add one or more of the UV stabilizers $C_x$) mentioned by way of example to the polyisocyanate composition A), preferably in amounts of 0.001% to 3.0% by weight, more preferably 0.01% to 2% by weight, calculated as the total amount of UV stabilizers used, based on the total weight of the polyisocyanate composition A).

Suitable antioxidants $C_y$) are preferably sterically hindered phenols, which may be selected preferably from the group consisting of 2,6-di-tert-butyl-4-methylphenol (ionol), pentaerythritol tetrakis(3-(3,5-di-tert-butyl-4-hydroxyphenyl)propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5-di-tert-butyl-4-hydroxyphenyl)propionate]. If required, they can be used either individually or in any desired combinations with one another.

These antioxidants $C_y$) are preferably used in amounts of 0.01% to 3.0% by weight, more preferably 0.02% to 2.0% by weight, calculated as the total amount of antioxidants used, based on the polyisocyanate composition A).

The process of the invention can, apart from the small amounts of any catalyst solvents to be used in addition, be conducted in a solvent-free manner. Especially in the case of production of coatings or films, the polyisocyanate component can optionally also be diluted with organic solvents to reduce the processing viscosity. Solvents suitable for this purpose are, for example, the catalyst solvents that are inert toward isocyanate groups and have already been described above.

In addition, further auxiliaries and additives C) added, finally, may also be internal mould release agents $C_z$).

These are preferably the nonionic surfactants containing perfluoroalkyl or polysiloxane units that are known as mould release agents, quaternary alkylammonium salts, for example trimethylethylammonium chloride, trimethylstearylammonium chloride, dimethylethylcetylammonium chloride, triethyldodecylammonium chloride, trioctylmethylammonium chloride and diethylcyclohexyldodecylammonium chloride, acidic monoalkyl and dialkyl phosphates having 2 to 18 carbon atoms in the alkyl radical, for example ethyl phosphate, diethyl phosphate, isopropyl phosphate, diisopropyl phosphate, butyl phosphate, dibutyl phosphate, octyl phosphate, dioctyl phosphate, isodecyl phosphate, diisodecyl phosphate, dodecyl phosphate, didodecyl phosphate, tridecanol phosphate, bis(tridecanol) phosphate, stearyl phosphate, distearyl phosphate, and any desired mixtures of such mould release agents.

Particularly preferred mould release agents $C_z$) are the acidic mono- and dialkyl phosphates mentioned, most preferably those having 8 to 12 carbon atoms in the alkyl radical. Internal mould release agents $C_z$) are used in the process of the invention, if appropriate, preferably in amounts of 0.01% to 3.0% by weight, more preferably 0.02% to 2.0% by weight, calculated as the total amount of internal mould release agent used, based on the polyisocyanate composition A). In one embodiment of the process of the invention, a trimerization catalyst B) or a mixture of different trimerization catalysts B) is added to the polyisocyanate composition A) described, optionally under inert gas, for example nitrogen, or under reduced pressure, and optionally with additional use of the aforementioned solvents and auxiliaries and additives C), and mixed in homogeneously with the aid of a suitable mixing unit. The addition of catalyst B) and any solvents for additional use and auxiliaries and additives C) can take place in any sequence, successively or in a mixture, in the above-specified amounts, generally at a temperature of 0 to 100° C., preferably of 15 to 80° C., more preferably of 20 to 60° C.

Step a) of the process of the invention consists in the provision of the polyisocyanate composition A). The above-described auxiliaries and additives C) may be added thereto. Prior to step b) of the process of the invention, a suitable catalyst B) is added in each case. The application of the reaction mixture thus obtained can be effected by different methods known per se according to the end use. For production of films or coatings, for example paints, the reaction mixture can be applied, for example, by spraying, spreading, dipping or flow-coating or with the aid of brushes, rollers or doctor blades, in one or more layers to any desired substrates, for example metal, wood, glass, stone, ceramic materials, concrete, hard and flexible plastics, textiles, leather and paper, which may optionally also be provided with standard primers prior to the coating.

For production of solid bodies, for example semi-finished products or mouldings, the reaction mixture may be introduced into open or closed moulds, for example by simple manual pouring, or with the aid of suitable machinery, for example the low-pressure or high-pressure machinery which is standard in polyurethane technology.

The catalytic trimerization in step b) is conducted under the reaction conditions which enable trimerization. The reaction conditions are dependent on the starting materials and catalysts used, and are either known to the person skilled in the art or can be determined by simple tests. For example, the trimerization reaction in step b) can be started by heating the coated substrates or filled moulds, the optimal reaction temperature, depending on the catalyst chosen in each case, being 20 to 250° C., preferably from 40 to 200° C., more preferably from 60 to 150° C. The reaction temperature can be kept constant within the range specified during step b) to give the bulk polyisocyanurate material or intermediate, or else be heated up over the course of several hours in a linear or stepwise manner up to a temperature greater than 80° C., preferably greater than 100° C., for example up to 130° C. When "reaction temperature" is being discussed here, this means the ambient temperature. When "bulk material" is being discussed here, what is meant is the polyisocyanurate intermediate obtained in step b), i.e. prior to contacting with the functionalizing reagent D) in step c). The expression "bulk" is based here on the surface-functionalized polyisocyanurate plastic obtained, as opposed to "surface", and refers to the non-functionalized polyisocyanurate plastic within or beneath the functionalized surface. In a preferred embodiment, the polyisocyanurate plastic obtainable by the process of the invention consists to an extent of at least 50%, 60%, 70%, 80%, 90%, 95% or 99% by weight of bulk material, and correspondingly to an extent of at most about 50%, 40%, 30%, 20%, 10%, 5% or 1% by weight of functionalized polyisocyanurate plastic ("functionalized surface"). The polyisocyanurate plastic obtainable by the process of the invention may also consist to an extent of at least 50%, 60%, 70%, 80%, 90%, 95% or 99% by volume of bulk material, and correspondingly to an extent of at most about 50%, 40%, 30%, 20%, 10%, 5% or 1% by volume of functionalized polyisocyanurate plastic ("functionalized surface").

Depending on the chosen mixture of the polyisocyanate composition A), the catalyst B) and any auxiliaries and additives C) present, and the chosen reaction temperature, the trimerization reaction, step b), is at first conducted over a period which, depending on the desired use, may extend from a few seconds or a few hours even up to days, until a bulk polyisocyanurate material is obtained as intermediate. When step b) is complete and the transition to step c) (addition of the functionalizing reagent) is appropriate depends on the desired properties of the polyisocyanurate plastic obtained and the desired degree of functionalization. For various applications, for example, different ratios of bulk polyisocyanurate material to functionalized polyisocyanurate surface material may be advantageous.

An embodiment of the process of the invention of particular practical relevance envisages conducting the catalytic trimerization in step b) up to the gel point, as defined below. The gel point is understood to mean the juncture at which the crosslinking density in the reaction mixture is so far advanced that the viscosity of the reaction mixture rises abruptly and the reaction mixture gelates, i.e. no longer significantly deforms or flows. In a particular embodiment of the invention, the reaction mixture thus obtained has a pot life, defined as the time span from the mixing of the polyisocyanate composition A) with the trimerization catalyst B) until the time at which the viscosity of the reaction mixture is twice the starting value, of greater than 10 min at room temperature. This assures both reliable miscibility and reliable and simple processing without the risk of a reaction that proceeds in an uncontrolled manner with significant evolution of heat.

It has been found to be particularly practicable to continue the catalytic trimerization in step b) until a viscosity of at least 100000 mPas, preferably at least 250000 mPas, more preferably at least 500000 mPas, especially at least 1000000 mPas, and/or the gel point has been attained.

In a further preferred embodiment of the invention, the intermediate obtained in step b) has a viscosity sufficiently high that complete mixing does not take place in the course of contacting with the functionalizing reagent in step c), but at least an intact layer of the bulk polyisocyanurate material is instead conserved. An "intact layer of the bulk polyisocyanurate material" means that no incorporation of the functionalizing reagent D) has taken place in this layer and the polyisocyanurate structure of the layer is thus unfunctionalized. In one embodiment of the invention, the thickness of the "intact layer that does not come into contact with the functionalizing reagent D)" is preferably at least 5 micrometres, especially at least 10 micrometers, more preferably at least 100 micrometers.

Proceeding from monomeric polyisocyanates, the gel point is typically attained only at distinctly higher isocyanate conversions of well above 65%, since a crosslinking density sufficient for gelation, proceeding from monomeric polyisocyanates having isocyanate functionalities of not more than two, i.e. not more than two isocyanate groups per molecule, is statistically achieved only at relatively high isocyanate conversions. By contrast, the use of oligomeric polyisocyanates having isocyanate functionalities greater than two, i.e. more than two isocyanate groups per molecule, results statistically in a high crosslinking density at a much earlier stage, i.e. at less than 65% conversion, such that gelation of the reaction mixture is thus achieved at a much earlier stage. In a particular embodiment of the invention, the trimerization reaction up to the gel point at reaction temperature is complete within less than 36 h, preferably less than 12 h, more preferably less than 5 h, most preferably within less than 1 h.

The progress of the reaction can initially still be determined by titrimetric determination of the NCO content, but gelation and solidification of the reaction mixture sets in rapidly with advancing conversion, which makes wet-chemical analysis methods impossible. The further conversion of isocyanate groups can then only be monitored by spectroscopic methods, for example by IR spectroscopy with reference to the intensity of the isocyanate band at about 2270 cm$^{-1}$. The required residual isocyanate content to attain the gel point can be obtained statistically by calculation methods known to those skilled in the art from the functionalities and reactivities of the components.

When "intermediate" is mentioned here, this means an isolable intermediate. "Isolable" in this context means that the intermediate, if desired, can be isolated. As detailed above, however, this need not be done. Instead, the functionalizing reagent in step c) can also be contacted with the intermediate obtained in step b) in situ, i.e. during the ongoing trimerization reaction. This can be effected, for example, in step c) by spraying, pouring or layering application of the functionalizing reagent during the continuing trimerization reaction (i.e. continuous running of steps b) and d)).

The terms "intermediate" and "bulk polyisocyanurate material" are used here synonymously in relation to the process of the invention.

In one embodiment of the invention, the intermediate is isolated prior to addition of the functionalizing reagent D). In an alternative embodiment of the invention, the functionalizing reagent D) is added without prior isolation of the intermediate. What is essential to the invention is that the intermediate is not a fully reacted polyisocyanurate but especially still has isocyanate groups for further reaction with the functionalizing reagent D). It has been found to be particularly practicable to conduct the catalytic trimerization of the polyisocyanate composition A) in step b) up to a conversion level at which more than 20%, preferably more than 25%, especially more than 30%, more preferably more than 35%, of isocyanate groups originally present in the polyisocyanate composition A) are present. In other words, more than 20%, preferably more than 25%, especially more than 30%, more preferably more than 35%, of the isocyanate groups originally present in the polyisocyanate composition A) are present in the intermediate.

It has been found to be advantageous to contact the functionalizing reagent D) with the surface of the bulk polyisocyanurate material at a temperature of −50-250° C., preferably 0-200° C., more preferably 50-150° C. The contacting of the functionalizing reagent D) with the surface of the intermediate can be effected with the aid of typical methods which are used to alter surfaces, examples being physical vapour deposition (PVC), chemical vapour deposition (CVD), plasma-enhanced chemical gas phase deposition (PECVD), plasma-induced grafting, reactive ion etching (RIE), atomic layer deposition (ALD), dip-coating, spray-coating and spin-coating, and electrochemical deposition methods. In a preferred embodiment of the invention, the contacting of the functionalizing reagent D) with the surface of the intermediate in step c) is effected by flow coating, dipping, spraying, printing, pipetting, roller coating, bar coating, scattering, vapour deposition and/or painting. In a particular embodiment of the invention, the functionalizing reagent is applied by vapour deposition.

The contacting of the functionalizing reagent D) in the process of the invention can be effected from solvents that are inert by nature, but also solvents that do not react preferentially in the presence of the functionalizing reagent D), for example water.

A particularly practicable contact time starting from contacting of the functionalizing reagent D) has been found here to be at least 1 s, preferably at least 30 s, preferably at least 120 s. Within this period of time, the functionalizing reagent D) reacts to a proportionate degree with the as yet unconverted groups of the bulk material and in so doing produces a functionalization gradient from the surface into the interior of the bulk material.

In a preferred embodiment of the invention, between steps c) and d), excess functionalizing reagent D) is removed. The excess functionalizing reagent D) can be removed after the reaction, for example, by washing it off, stripping it off, sucking it off or distilling it off.

The functionalization reaction, i.e. the performance of steps a) to d), at reaction temperature (ambient temperature) is complete within less than 36 h, preferably less than 24 h, more preferably less than 8 h.

In one embodiment of the invention, the contacting of the functionalizing reagent D) in step c) can be effected by the methods mentioned as soon as the intermediate has been obtained as described above. More particularly, the contacting of the functionalizing reagent D) can be effected without prior isolation of the intermediate. In one embodiment of the invention, the contacting of the functionalizing reagent D) is effected immediately, as soon as the intermediate has been obtained as described above. "Immediately" in this context means at a time less than 120 s, preferably less than 30 s, more preferably less than 1 s, with respect to the obtaining of the intermediate.

Examples of functionalizing reagents D) for use in accordance with the invention in step c) include compounds containing alcohol, thiol, amine, epoxide, anhydride, organic acid and/or isocyanate groups or mixtures thereof. In a preferred embodiment of the process of the invention, the compounds used as functionalizing reagent D) have at least one isocyanate-reactive group per molecule. The functionalizing reagent D) used may thus also be water. Preference is given to those compounds which feature exceptional surface-active properties. Examples include compounds having high refractive indices, e.g. thio-containing compounds, compounds having low refractive indices, i.e. fluorine-containing compounds, hydrophilic compounds, e.g. polyethylene oxide, or neutralizable compounds, e.g. acids or bases, or hydrophobic compounds, e.g. polyalkyl- or polyfluoro-containing compounds, or else compounds having specific properties, for example intercalation opportunities for ions, for example the class of the calixarenes.

Polyols suitable in accordance with the invention as functionalizing reagent D) have an OH functionality of ≥1 to ≤6, for example sugars, polyacrylates, polyesters, polylactones, polyethers, polycarbonates, polyestercarbonates, polyacetals, polyolefins and polysiloxanes. Preference is given to polyols having a number-average molecular weight of ≥100 g/mol to ≤2500 g/mol and an OH functionality of ≥1 to ≤3. The number-average molecular weight can be determined in accordance with DIN 55672-1 by gel permeation chromatography (GPC) in tetrahydrofuran (THF) at 23° C.

The polycarbonates having hydroxyl groups that are useful in accordance with the invention as functionalizing reagent D) are obtainable by reaction of carbonic acid derivatives, for example diphenyl carbonate, dimethyl carbonate or phosgene, with diols. Useful diols of this kind include, for example, ethylene glycol, propane-1,2- and 1,3-diol, butane-1,3- and 1,4-diol, hexane-1,6-diol, octane-1,8-diol, neopentyl glycol, 1,4-bishydroxymethylcyclohexane, 2-methylpropane-1,3-diol, 2,2,4-trimethylpentane-1,3-diol, dipropylene glycol, polypropylene glycols, dibutylene glycol, polybutylene glycols, bisphenol A, tetrabromobisphenol A, but also lactone-modified diols. Preferably, the diol component contains 40% by weight to 100% by weight of hexanediol, preferably hexane-1,6-diol and/or hexanediol derivatives, especially those having ether or ester groups as well as terminal OH groups. Examples include products which have been obtained by reaction of 1 mol of hexanediol with at least 1 mol, preferably 1 to 2 mol, of caprolactone according to DE-A 1 770 245, or by etherification of hexanediol with itself to give di- or trihexylene glycol. The preparation of such derivatives is known, for example, from DE-A 1 570 540. The polyether polycarbonate diols described in DE-A 3 717 060 can also be used in accordance with the invention as functionalizing reagent D).

The hydroxyl polycarbonates usable in accordance with the invention as functionalizing reagent D) should preferably be linear. However, they may optionally be lightly branched by the incorporation of polyfunctional components, especially low molecular weight polyols. Suitable examples for this purpose are glycerol, trimethylolpropane, hexane-1,2,6-triol, butane-1,2,4-triol, trimethylolpropane, pentaerythritol, chinit, mannitol and sorbitol, methyl glycoside, 1,3,4,6-dianhydrohexitols.

Polyether polyols likewise usable in accordance with the invention as functionalizing reagent D) are polytetramethylene glycol polyethers which can be prepared, for example, via polymerization of tetrahydrofuran by cationic ring opening.

In addition, inventive polyether polyols suitable as functionalizing reagent D) are the polyaddition products, prepared using starter molecules, of ethylene oxide, propylene oxide, butylene oxide, styrene oxide or epichlorohydrin, and the mixed and graft polyaddition products thereof, and the polyethers obtained by condensation of polyhydric alcohols or mixtures thereof and those obtained by alkoxylation of water, polyhydric alcohols, amines or amino alcohols. In a preferred embodiment, in accordance with the invention, homo- and/or copolyaddition compounds of ethylene oxide and/or propylene oxide are used.

Polyester polyols suitable for the inventive use as functionalizing reagent D) are, for example, the polycondensates known per se of di- and optionally tri- and tetraols, and optionally tri- and tetracarboxylic acids or hydroxycarboxylic acids or lactones. Instead of the free polycarboxylic acids, it is also possible to use the corresponding polycarboxylic anhydrides or corresponding polycarboxylic esters of lower alcohols to prepare the polyesters. Examples of diols suitable for the purpose are ethylene glycol, butylene glycol, diethylene glycol, triethylene glycol, polyalkylene glycols such as polyethylene glycol, and also propane-1,2-diol, propane-1,3-diol, butane-1,3-diol, butane-1,4-diol, hexane-1,6-diol and isomers, neopentyl glycol or neopentyl glycol hydroxypivalate. In addition, it is also possible to use polyols such as trimethylolpropane, glycerol, erythritol, pentaerythritol, trimethylolbenzene or trishydroxyethyl isocyanurate. Suitable dicarboxylic acids in this context are, for example, phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid and/or 2,2-dimethylsuccinic acid. It is also possible to use the corresponding anhydrides as an acid source. Provided that the average functionality of the polyol to be esterified is greater than 2, it is additionally also possible to use monocarboxylic acids such as benzoic acid and hexanecarboxylic acid. Examples of hydroxycarboxylic acids that may be used as reaction participants in the preparation of a polyester polyol having terminal hydroxyl groups include hydroxycaproic acid, hydroxybutyric acid, hydroxydecanoic acid, hydroxystearic acid and the like. Suitable lactones are caprolactone, butyrolactone and homologues. Preference is given to caprolactone.

In a preferred embodiment of the invention, polyester polyols based on adipic acid and butane-1,4-diol and/or hexane-1,6-diol are used as functionalizing reagent D).

For this purpose, monofunctional alcohols and monoamines are useful as inventive functionalizing reagent D). Preferred monoalcohols are aliphatic monoalcohols having 1 to 18 carbon atoms, for example ethanol, n-butanol, ethylene glycol monobutyl ether, 2-ethylhexanol, 1-octanol, 1-dodecanol or 1-hexadecanol. Preferred monoamines are aliphatic monoamines, for example diethylamine, dibutylamine, ethanolamine, N-methylethanolamine or N,N-diethanolamine, and amines from the Jeffamine® M series (Huntsman Corp. Europe, Belgium) or amino-functional polyethylene oxides and polypropylene oxides.

Likewise suitable as functionalizing reagent D) are polyols, amino polyols or polyamines having a molar mass below 400 g/mol.

Preferred polyols usable in accordance with the invention as functionalizing reagent D) are, for example:
a) alkanediols or -triols, such as ethanediol, propane-1,2- and 1,3-diol, butane-1,4- and -2,3-diol, pentane-1,5-diol, 1,3-dimethylpropanediol, hexane-1,6-diol, neopentyl glycol, cyclohexane-1,4-dimethanol, 2-methylpropane-1,3-diol, 2-ethyl-2-butylpropanediol, trimethylpentanediol, positionally isomeric diethyloctanediols, cyclohexane-1,2- and 1,4-diol, hydrogenated bisphenol A [2,2-bis(4-hydroxycyclohexyl)propane], 2,2-dimethyl-3-hydroxypropyl 2,2-dimethyl-3-hydroxypropionate, trimethylolethane, trimethylolpropane or glycerol,
b) ether diols such as diethylene diglycol, triethylene glycol, tetraethylene glycol, dipropylene glycol, tripropylene glycol, 1,3-butylene glycol or hydroquinone dihydroxyethyl ether,
c) ester diols of the general formulae (I) and (II)

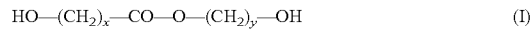

$$HO-(CH_2)_x-CO-O-(CH_2)_y-OH \quad (I)$$

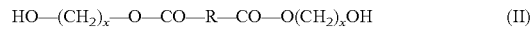

$$HO-(CH_2)_x-O-CO-R-CO-O(CH_2)_xOH \quad (II)$$

in which
R is an alkylene or arylene radical having 1 to 10 carbon atoms, preferably 2 to 6 carbon atoms,
x is 2 to 6 and
y is 3 to 5,
for example δ-hydroxybutyl ε-hydroxycaproate, ω-hydroxyhexyl, γ-hydroxybutyrate, β-hydroxyethyl adipate and bis(β-hydroxyethyl) terephthalate, and
d) di- and polyamines, for example 1,2-diaminoethane, 1,3 diaminopropane, 1,6-diaminohexane, 1,3- and 1,4-phenylenediamine, 4,4'-diphenylmethanediamine, isophoronediamine, isomer mixture of 2,2,4- and 2,4,4-trimethylhexamethylenediamine, 2-methylpentamethylenediamine, diethylenetriamine, 1,3- and 1,4-xylylenediamine, α,α,α',α'-tetramethyl-1,3- and -1,4-xylylenediamine, 4,4-diaminodicyclohexylmethane, amino-functional polyethylene oxides or polypropylene oxides, obtainable under the name of the Jeffamine D series (from Huntsman Corp. Europe, Belgium), diethylenetriamine and triethylenetetramine. Suitable diamines in the context of the invention are also hydrazine, hydrazine hydrate and substituted hydrazines, for example N-methylhydrazine, N,N'-dimethylhydrazine and homologues thereof, and also acid hydrazides, adipic acid, β-methyladipic acid, sebacic acid, hydracrylic acid and terephthalic acid, semicarbazidoalkylene hydrazides, for example β-semicarbazidopropionic acid hydrazide (described, for example, in DE-A 1 770 591), semicarbazidoalkylene carbazine esters, for example 2-semicarbazidoethylcarbazine ester (described, for example, in DE-A 1 918 204) or else aminosemicarbazide compounds, for example β-aminoethyl semicarbazidocarbonate (described, for example, in DE-A 1 902 931).

Further compounds suitable in accordance with the invention as functionalizing reagent D) contain ionic groups which may either be cationic or anionic in nature. Compounds that act as cationic and anionic dispersants are those which, for example, sulphonium, ammonium, phosphonium, carboxylate, sulphonate or phosphonate groups or which groups which can be converted by salt formation to the aforementioned groups (potentially ionic groups), and can be incorporated into the macromolecules via isocyanate-reactive groups present. Isocyanate-reactive groups suitable with preference in accordance with the invention as functionalizing reagent D) are hydroxyl and amine groups.

Ionic or potentially ionic compounds which can be used in accordance with the invention as functionalizing reagent D) are, for example, mono- and dihydroxycarboxylic acids, mono- and diaminocarboxylic acids, mono- and dihydroxysulphonic acids, mono- and diaminosulphonic acids and mono- and dihydroxyphosphonic acids or mono- and diaminophosphonic acids and salts thereof, such as dimethylolpropionic acid, dimethylolbutyric acid, hydroxypivalic acid, N-(2-aminoethyl)-β-alanine, 2-(2-aminoethylamino) ethanesulphonic acid, propylene-1,2- or -1,3-diamine-β-ethylsulphonic acid, ethylenediaminepropyl- or -butylsulphonic acid, malic acid, citric acid, glycolic acid, lactic acid, glycine, alanine, taurine, lysine, 3,5-diaminobenzoic acid, an addition product of IPDI and acrylic acid (EP-A 0 916 647, Example 1) and the alkali metal and/or ammonium salts thereof; the adduct of sodium bisulphite onto but-2-ene-1, 4-diol, polyethersulphonate, the propoxylated adduct of 2-butenediol and NaHSO3, described, for example, in DE-A 2 446 440 (pages 5-9, formulae and units that can be converted to cationic groups, such as N-methyldiethanolamine, as hydrophilic formation components. Preferred ionic or potentially ionic compounds are those having carboxyl or carboxylate and/or sulphonate groups and/or ammonium groups. Particularly preferred ionic compounds usable in accordance with the invention as functionalizing reagent D) are those containing carboxyl and/or sulphonate groups as ionic or potentially ionic groups, such as the salts of N-(2-aminoethyl)-β-alanine, of 2-(2-aminoethylamino) ethanesulphonic acid or of the addition product of IPDI and acrylic acid (EP-A 0 916 647, Example 1) and of dimethylolpropionic acid. Most preferably, the functionalizing reagent D) is selected from the sodium salts of N-(2-aminoethyl)-β-alanine or 2-(2-aminoethylamino)ethanesulphonic acid or from dimethylpropionic acid. In an advantageous embodiment of the invention, both sodium salts of N-(2-aminoethyl)-β-alanine or 2-(2-aminoethylamino)ethanesulphonic acid and dimethylpropionic acid are used as functionalizing reagent D).

Nonionic hydrophilizing compounds suitable as functionalizing reagent D) are, for example, polyoxyalkylene ethers containing at least one hydroxyl or amino group. These polyethers contain a proportion of 30% by weight to 100% by weight of units derived from ethylene oxide. Useful compounds include polyethers of linear construction having a functionality between 1 and 3, but also compounds of the general formula (III)

(III)

in which
$R^1$ and $R^2$ are each independently a divalent aliphatic, cycloaliphatic or aromatic radical which has 1 to 18 carbon atoms and may be interrupted by oxygen and/or nitrogen atoms, and $R^3$ is an alkoxy-terminated polyethylene oxide radical.

Nonionic hydrophilizing compounds are, for example, also monovalent polyalkylene oxide polyether alcohols having a statistical average of ≥5 to ≤70, preferably ≥7 to ≤55, ethylene oxide units per molecule, as obtainable in a manner known per se by alkoxylation of suitable starter molecules (for example in Ullmanns Encyclopädie der technischen Chemie, 4th edition, volume 19, Verlag Chemie, Weinheim p. 31-38).

Saturated monoalcohols suitable as functionalizing reagent D) are methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, for example diethylene glycol monobutyl ether, unsaturated alcohols such as allyl alcohol, 1,1-dimethylallyl alcohol or olein alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine, and heterocyclic secondary amines such as morpholine, pyrrolidine, piperidine or 1H-pyrazole.

The polyalkylene oxide polyether alcohols are either straight polyethylene oxide polyethers or mixed polyalkylene oxide polyethers, wherein the alkylene oxide units consist to an extent of at least 30 mol %, preferably to an extent of at least 40 mol %, of ethylene oxide units. Preferred nonionic compounds usable in accordance with the invention as functionalizing reagent D) are monofunctional mixed polyalkylene oxide polyethers having at least 40 mol % of ethylene oxide units and not more than 60 mol % of propylene oxide units.

Further suitable functionalizing reagents D) are, by way of example, unsaturated alcohols, for example allyl propargyl alcohols, and higher homologous compounds containing functional double bonds such as hydroxyethyl/propyl/butyl (meth)acrylates inter alia.

Fluorinated hydrophobic compounds suitable as functionalizing reagent D) are, for example, trifluoroethanol, hexafluoroisopropanol or an alcohol of the following general formula IV

$$F(CF_2CF_2)_nCH_2CH_2-OH \qquad (IV)$$

in which n is a natural number from 1 to 6, or mixtures of such compounds having different molar masses.

Likewise suitable in accordance with the invention as functionalizing reagent D) are, for example, mono- and difunctional thiol-, hydroxy- and amino-, and epoxy, functional poly(siloxanes), for example: 3-(aminopropyl)triethoxysilanes, bis(2-hydroxyethyl)-3-aminopropyltriethoxysilane, N-(hydroxyethyl)-N-methylaminopropyltrimethoxysilane, hydroxymethyltriethoxysilane, N-(triethoxysilylpropyl)-O-(polyethylene oxide)urethane, N-(3-triethoxysilylpropyl)-4-hydroxybutyramide, N-(3-triethoxysilylpropyl)gluconamide, 2,2-bis(3-triethoxysilylpropoxymethyl)butanol, 11-(trimethylsiloxy)undecyltriethoxysilane, γ-aminopropyltriethoxysilane, bis(triethoxysilyl)propylamine, 3-aminopropylmethyldimethoxysilane, aminopropyl (aminoethyl)dimethoxysilane.

In addition, it is also possible in accordance with the invention to use amino acids as functionalizing reagent D).

In a preferred embodiment of the invention, the functionalizing reagent D) may additionally contain suitable catalysts E) which promote the reaction of the functionalizing reagent with the intermediate or bulk polyisocyanurate material. These catalysts are especially commonly used catalysts which catalyse the reaction of isocyanate-reactive compounds with isocyanates. Examples include urethanization catalysts, for example triethylamine, 1,4-diazabicyclo-[2.2.2]-octane, dibutyltin oxide, tin dioctoate, dibutyltin dilaurate, tin bis(2-ethylhexanoate), zinc dioctoate, zinc bis(2-ethylhexanoate) or other organometallic compounds. It has been found to be particularly practicable in the process of the invention when the functionalizing reagent D) comprises, as additional catalyst E), a catalyst selected from dibutyltin dilaurate, zinc dioctoate and zinc bis(2-ethylhexanoate). In a particularly preferred embodiment of the invention, the additional catalyst E) present in the functionalizing reagent D) is selected from zinc bis(2-ethylhexanoate) and catalysts which promote the formations of oxazolidinones and also isocyanurates, and mixtures thereof. The catalysts E) may also, according to the composition of the reaction mixture, selection of the functionalization reagent and reaction conditions, also be selected from the compounds enumerated above for the catalysts B) in the appropriate amounts and optionally with use of the above-specified catalyst solvents.

In a further embodiment of the invention, the functionalizing reagent D) may comprise the same auxiliaries and additives which may also be present in the polyisocyanate composition A) and which have already been described further up.

The polyisocyanurate plastics of the invention having a functionalized surface that are obtained in step d) are preferably polyisocyanurate plastics with high conversion, i.e. those in which the trimerization reaction to give polyisocyanurate structures is very substantially complete. A trimerization reaction to give polyisocyanurate structures can be regarded as "very substantially complete" in the context of the present invention when, after step d), at least 80%, preferably at least 90% and more preferably at least 95% of the free isocyanate groups originally present in the polyisocyanate composition A) have reacted. In other words, preferably only at most 20%, at most 10% and more preferably at most 5% of the isocyanate groups originally present in the polyisocyanate composition A) are present in the polyisocyanurate plastic of the invention after step d). This can be achieved by continuing the catalytic trimerization in step d) in the process of the invention at least up to a conversion level at which only, for example, at most 20% of isocyanate groups originally present in the polyisocyanate composition A) are present, such that a polyisocyanurate with high conversion is obtained. The percentage of isocyanate groups still present can be determined by a comparison of the content of isocyanate groups in % by weight in the original polyisocyanate composition A) with the content of isocyanate groups in % by weight in the reaction product, for example by the aforementioned comparison of the intensity of the isocyanate band at about 2270 cm$^{-1}$ by means of IR spectroscopy.

The process of the invention makes it possible to obtain, in a simple manner, polyisocyanurate plastics having a differently functionalized surface.

The invention is elucidated in detail hereinafter with reference to examples.

EXAMPLES

All percentages are based on weight, unless stated otherwise.

All the viscosity measurements were made with a Physica MCR 51 rheometer from Anton Paar Germany GmbH (DE) to DIN EN ISO 3219.

The glass transition temperature T was determined by means of DSC (differential scanning calorimetry) with a Mettler DSC 12E (Mettler Toledo GmbH, Giessen, Germany) in accordance with DIN EN 61006. Calibration was effected via the melt onset temperature of indium and lead. 10 mg of substance were weighed out in standard capsules. The measurement was effected by three heating runs from −50° C. to +200° C. at a heating rate of 20 K/min with subsequent cooling at a cooling rate of 320 K/min. Cooling was effected by means of liquid nitrogen. The purge gas used was nitrogen. The values reported in the table below are each based on the evaluation of the 1st heating curve, since changes in the sample in the measurement process at high temperatures are possible in the reactive systems being examined as a result of the thermal stress in the DSC. The glass transition temperature $T_g$ determined was the temperature at half the height of a glass transition step.

Shore hardnesses were measured on the underside of the specimens to DIN 53505 with the aid of a Zwick 3100 Shore hardness tester (from Zwick, Germany) at 23° C. and 50% air humidity.

The contents (mol %) of the uretdione, isocyanurate, allophanate, biuret, iminooxadiazinedione and/or oxadiazinetrione structures present in the starting polyisocyanates were calculated from the integrals of proton-decoupled $^{13}$C NMR spectra (recorded on a Bruker DPX-400 instrument) and are each based on the sum total of uretdione, isocyanurate, allophanate, biuret, iminooxadiazinedione and/or oxadiazinetrione structures present. In the case of HDI polyisocyanates, the individual structural elements have the following chemical shifts (in ppm): uretdione: 157.1; isocyanurate: 148.4; allophanate: 155.7 and 153.8, biuret: 155.5; iminooxadiazinedione: 147.8, 144.3 and 135.3; oxadiazinetrione: 147.8 and 143.9.

IR spectra were recorded on a TraTwo FT-IR spectrometer equipped with an ATR unit from Perkin Elmer, Inc.

Starting Materials

Starting Polyisocyanate (Oligomeric Polyisocyanate)

HDI polyisocyanate containing isocyanurate groups, prepared in accordance with Example 11 of EP-A 330 966, with the alteration that the catalyst solvent used was 2-ethylhexanol rather than 2-ethylhexane-1,3-diol. The reaction was stopped at an NCO content of the crude mixture of 42% by adding dibutyl phosphate. Subsequently, unconverted HDI was removed by thin-film distillation at a temperature of 130° C. and a pressure of 0.2 mbar.

NCO content: 23.0%
NCO functionality: 3.2
Monomeric HDI: 0.1%
Viscosity (23° C.): 1200 mPas
Density (20° C.): 1.17 g/cm$^3$ Distribution of the oligomeric structure types:
Isocyanurate: 89.7 mol %
Iminooxadiazinedione 2.5 mol %
Uretdione 2.7 mol %
Allophanate: 5.1 mol %

Functionalizing Reagents:
1. glycerol (hydrophilic)
2. lauryl alcohol (hydrophobic)
3. Dytek A (hydrophilic)
4. Desmophen NH 1220 (hydrophilic)
5. Dabco 33LV (urethanization catalyst)

Glycerol and lauryl alcohol were purchased from Merck in PA quality, and each was blended with 3% of a solution of Dabco 33LV (33% strength) based on the total amount of polyol as urethanization catalyst and used as such.

Dytek A was purchased from Sigma-Aldrich in PA quality and used as such.

Desmophen NH 1220 (sterically hindered secondary diamine) was purchased from Bayer Material Science and used as obtained.

HDI=hexamethylene diisocyanate=Desmodur H was purchased from Bayer Material Science and used as obtained.

Dabco 33LV purchased from Sigma-Aldrich and used as obtained.

Working Example

Inventive Process 100 g of the starting polyisocyanate were weighed into a polypropylene cup together with a catalyst mixture consisting of 0.177 g of potassium acetate, 0.475 g of [18]crown-6 and 3.115 g of diethylene glycol, and homogenized at 2750 rpm with the aid of a Speed-Mixer DAC 150 FVZ (from Hauschild, Germany) for 1 min. 16 g of the contents of the polypropylene cup in each case were weighed into an aluminium dish of diameter 6.3 cm and depth 1 cm. The aluminium dish thus filled was heated in a drying cabinet at 50° C. for 40 min. During this time, the starting polymer was converted by progressive trimerization of the starting polyisocyanate used to a gel-like mass which no longer forms threads at RT after contact with a wooden splint, achieving a conversion of <80% of the isocyanate groups used.

2.5 g of the respective functionalizing reagent were poured onto the polyisocyanurate mass thus obtained. According to the functionalizing reagent chosen, the blanketed mass was kept at a selected temperature (see table of experiments in each case) for a selected time. Thereafter, it was cooled to RT and excess functionalizing reagent was removed by repeated washing with acetone and water, and the mass having surface functionalization on one side that was thus obtained was cured at 180° C. for 10 minutes up to a conversion of more than 80%, based on the isocyanate groups used in the starting polyisocyanate, by continuing the trimerization. Alternatively, the functionalizing reagent is poured onto the gel-like mass and heated together therewith to 180° C. for 10 minutes and then, as described above, excess functionalizing reagent is removed by repeated washing with acetone and water.

Non-Inventive Process 100 g of the starting polyisocyanate were weighed into a polypropylene cup together with a catalyst mixture consisting of 0.177 g of potassium acetate, 0.475 g of [18]crown-6 and 3.115 g of diethylene glycol, and homogenized at 2750 rpm with the aid of a Speed-Mixer DAC 150 FVZ (from Hauschild, Germany) for 1 min. 16 g of the contents of the polypropylene cup in each case were weighed into an aluminium dish of diameter 6.3 cm and depth 1 cm. The aluminium dish thus filled was heated in a drying cabinet at 150° C. for 40 min, and the starting polyisocyanate present was preferentially converted by trimerization to a polyisocyanurate. In the course of this, the starting polymer was converted to a solid mass, achieving a conversion of >80%, based on the isocyanate groups used in the starting polyisocyanate.

The functionalizing was effected analogously to the inventive process by cooling to RT, blanketing with functionalizing reagent, etc.

The results of the functionalization are compared by means of surface IR analysis (ATR) with reference to succinct signals. For comparison, for the functionalized side and the unfunctionalized side, the NH—OH vibration in the region of about 3400 cm$^{-1}$, the bands corresponding to the CH stretch vibration in the region of about 2900 cm$^{-1}$, and the bands corresponding to the NCO vibration in the region of about 2300 cm$^{-1}$ and to the isocyanurate vibration in the region of about 1650 cm$^{-1}$ were compared in terms of peak height. For this purpose, normalization was effected in each case to the isocyanurate vibration of the functionalized and unfunctionalized side. If the ratios of isocyanurate vibration to isocyanate vibration to CH stretch vibration and NH—OH vibration differ, this is a clear indication of an altered chemical surface, i.e. that surface modification or functionalization has taken place. The examples cited are intended to illustrate merely the method in principle. Contact conditions, residual isocyanate content and reactivity of the reagents allow a broad variation in the desired surface modification or functionalization in terms of absolute magnitude and in terms of penetration depth, i.e. the depth to which the functionalizing reagent penetrates during the contact time proceeding from the surface of the bulk material into the interior of the bulk material.

| Sample | Functionalizing reagent | Conditions | Peak height ratios in ATR measurement: OH—NH to C—H stretch to NCO to isocyanurate unfunctionalized functionalized |
|---|---|---|---|
| 1 | glycerol | 30 min 50° C. | 0.1:0.5:0:2<br>0.4:0.6:0:2 |
| 2 | | 10 min 180° C. | 0.05:0.5:0:2<br>3:2:0:2 |
| 3 | lauryl alcohol | 30 ml/min; 50° C. | 0.05:0.4:0.1:2.2<br>0.3:0.8:0:2.2 |
| 4 | | 10 min 180° C. | 0.05:0.4:0.1:2.2<br>0.2:0.8:0.1:2.2 |
| 5 | Desmophen NH1220 | 10 ml/min; 23° C. | 0.05:0.4:0.2:2.2<br>0.2:0.4:0.7:2.2 |
| 6 | | 20 min 50° C. | 0.05:0.3:0.1:2<br>0.2:0.6:0.3:2.2 |
| 7 | Dytek A | 10/23° C. | 0.05:0.35:0.1:2<br>0.4:0.9:0.05:2 |
| 8-14 | Comparative experiments<br>8, 9 glycerol<br>10, 11 lauryl alcohol<br>12, 13 Desmophen NH1220<br>14 Dytek A | Analogous execution of the functionalization to 1-7 proceeding from a specimen with >80% conversion of isocyanate functionality of the starting polyisocyanate with 1 as 8, 2 as 9, etc. | Before and after functionalization by the non-inventive process, no significant difference in the ATR analyses of the surfaces was found. What was obtained was always the spectrum of a typical unfunctionalized surface with the following peak ratios:<br>0.1:0.4:0.1:2 |

The inventive examples show consistently clear functionalization of the surface with a wide variety of different functionalizing reagents. Well-defined surfaces are obtained which clearly differ from unfunctionalized bodies. It can also be seen that functionalizing reaction does not significantly impair the final curing and further reaction of the starting polyisocyanate by trimerization by the process of the invention.

The invention claimed is:

1. A process for producing polyisocyanurate plastics having a functionalized surface, comprising the following steps:
   a) providing a polyisocyanate composition A) containing monomeric and/or oligomeric polyisocyanates;
   b) catalytically trimerizing the polyisocyanate composition A) so as to obtain a bulk polyisocyanurate material as intermediate;
   c) surface functionalizing the intermediate by contacting at least one surface of the intermediate with at least one functionalizing reagent D);
   d) continuing the catalytic trimerization.

2. The process according to claim 1, wherein the catalytic trimerization in step b) is continued until a viscosity of at least 100000 mPas or the gel point has been attained.

3. The process according to claim 1, wherein the catalytic trimerization in step b) is effected up to a conversion level at which more than 20% of isocyanate groups originally present in the polyisocyanate composition A) are present.

4. The process according to claim 1, wherein the continuation of the catalytic trimerization in step d) is effected up to a conversion level at which only at most 20% of isocyanate groups originally present in the polyisocyanate composition A) are present.

5. The process according to claim 1, wherein the contacting in step c) is effected by flow coating, dipping, spraying, printing, pipetting, roller coating, bar coating, scattering, vapour deposition or painting.

6. The process according to claim 1, wherein excess functionalizing reagent D) is removed between steps c) and d).

7. The process according to claim 1, wherein the functionalizing reagent D) is selected from the group consisting of compounds containing alcohol, thiol, amine, epoxide, anhydride, organic acid, isocyanate groups and mixtures thereof.

8. The process according to claim 1, wherein the polyisocyanate composition A) contains predominantly oligomeric polyisocyanates and is low in monomeric polyisocyanates wherein said low in monomeric polyisocyanates wherein the polyisocyanate composition A) has a content of monomeric polyisocyanates of not more than 20% by weight, based on the weight of the polyisocyanate composition A).

9. Process according to claim 8, wherein the polyisocyanate composition A) has a content of monomeric polyisocyanates of not more than 15% by weight, based on the weight of the polyisocyanate composition A).

10. Process according to claim 8, wherein the polyisocyanate composition A) has a content of monomeric polyisocyanates of not more than 5% by weight, based on the weight of the polyisocyanate composition A).

11. The process according to claim 1, wherein the polyisocyanate composition A) has an isocyanurate structure content of at least 20 mol %, based on the sum total of the oligomeric structures from the group consisting of uretdione, isocyanurate, allophanate, biuret, iminooxadiazinedione and oxadiazinetrione structure present in the polyisocyanate composition A).

12. The process according to claim 1, wherein the polyisocyanate composition A) consists of at least 80% by weight, based on the weight of the polyisocyanate composition A), of monomeric diisocyanates having exclusively aliphatically bonded isocyanate groups.

13. The process according to claim 1, wherein the polyisocyanate composition A) consists of at least 95% by weight, based on the weight of the polyisocyanate composition A), of monomeric diisocyanates having exclusively aliphatically bonded isocyanate groups.

14. The process according to claim 1, wherein the oligomeric polyisocyanates consist of one or more oligomeric polyisocyanates formed from 1,4-diisocyanatobutane, 1,5-diisocyanatopentane, 1,6-diisocyanatohexane, isophorone diisocyanate or 4,4'-diisocyanatodicyclohexylmethane or mixtures thereof, and/or in that the monomeric polyisocyanates consist of one or more monomeric diisocyanates selected from 1,4-diisocyanatobutane, 1,5-diisocyanatopentane, 1,6-diisocyanatohexane, isophorone diisocyanate or 4,4'-diisocyanatodicyclohexylmethane or mixtures thereof.

15. The process according to claim 1, wherein the polyisocyanate composition A) has a mean NCO functionality of 2.0 to 5.0 or the polyisocyanate composition A) has a content of reactive isocyanate groups of 8% to 60% by weight, based on the weight of the polyisocyanate composition A).

16. The process according to claim 1, wherein the oligomeric polyisocyanates are selected from at least one oligomeric polyisocyanate having uretdione, isocyanurate, allophanate, biuret, iminooxadiazinedione or oxadiazinetrione structure or mixtures thereof.

17. A solid polyisocyanurate plastic having a functionalized surface obtainable from the process according to claim 1, wherein the functionalizing agent D) has at least one isocyanate-reactive group per molecule, and wherein the catalytic trimerization in step b) continues until a viscosity of at least 100000 mPas is reached.

* * * * *